United States Patent [19]

Benson

[11] 4,239,030
[45] Dec. 16, 1980

[54] FIELD BURNER APPARATUS

[76] Inventor: Everett H. Benson, Rte. #1, Box 229A, Eagle Creek, Oreg. 97022

[21] Appl. No.: 59,809

[22] Filed: Jul. 23, 1979

[51] Int. Cl.³ .............................................. F23C 5/00
[52] U.S. Cl. ................................. 126/271.1; 47/1.44; 126/271.3
[58] Field of Search ..................... 126/271.1, 271.2 R, 126/271.2 A, 271.2 C, 271.3; 47/1.44, 1.42; 43/144; 37/12; 56/1

[56] References Cited

U.S. PATENT DOCUMENTS

| | | | |
|---|---|---|---|
| 3,543,488 | 12/1970 | Kowalik et al. | 56/1 |
| 3,606,877 | 9/1971 | Shipp | 126/271.2 A |
| 3,802,020 | 4/1974 | Stone et al. | 37/12 |
| 3,809,060 | 5/1974 | Shirley et al. | 126/271.2 C |
| 4,088,122 | 5/1978 | Miles | 126/271.2 R |

OTHER PUBLICATIONS

"Consulting Engineers Report to the Oregon Field Sanitation Committee Covering 1975 & 1976 Activities" by Thomas R. Miles, Consulting Engineer, Oregon.

Primary Examiner—Samuel Scott
Assistant Examiner—Lee E. Barrett
Attorney, Agent, or Firm—Klarquist, Sparkman, Campbell, Leigh, Hall & Whinston

[57] ABSTRACT

A field burning vehicle providing a downwardly opening cavity for covering a burning area, with mechanism for withdrawing the combustion products from said cavity and forcing them through a high temperature furnace to burn the solids therein, and thereafter directing the clean hot gases onto the field forwardly of said cavity to elevate the temperature thereof prior to its being covered by said cavity.

10 Claims, 9 Drawing Figures

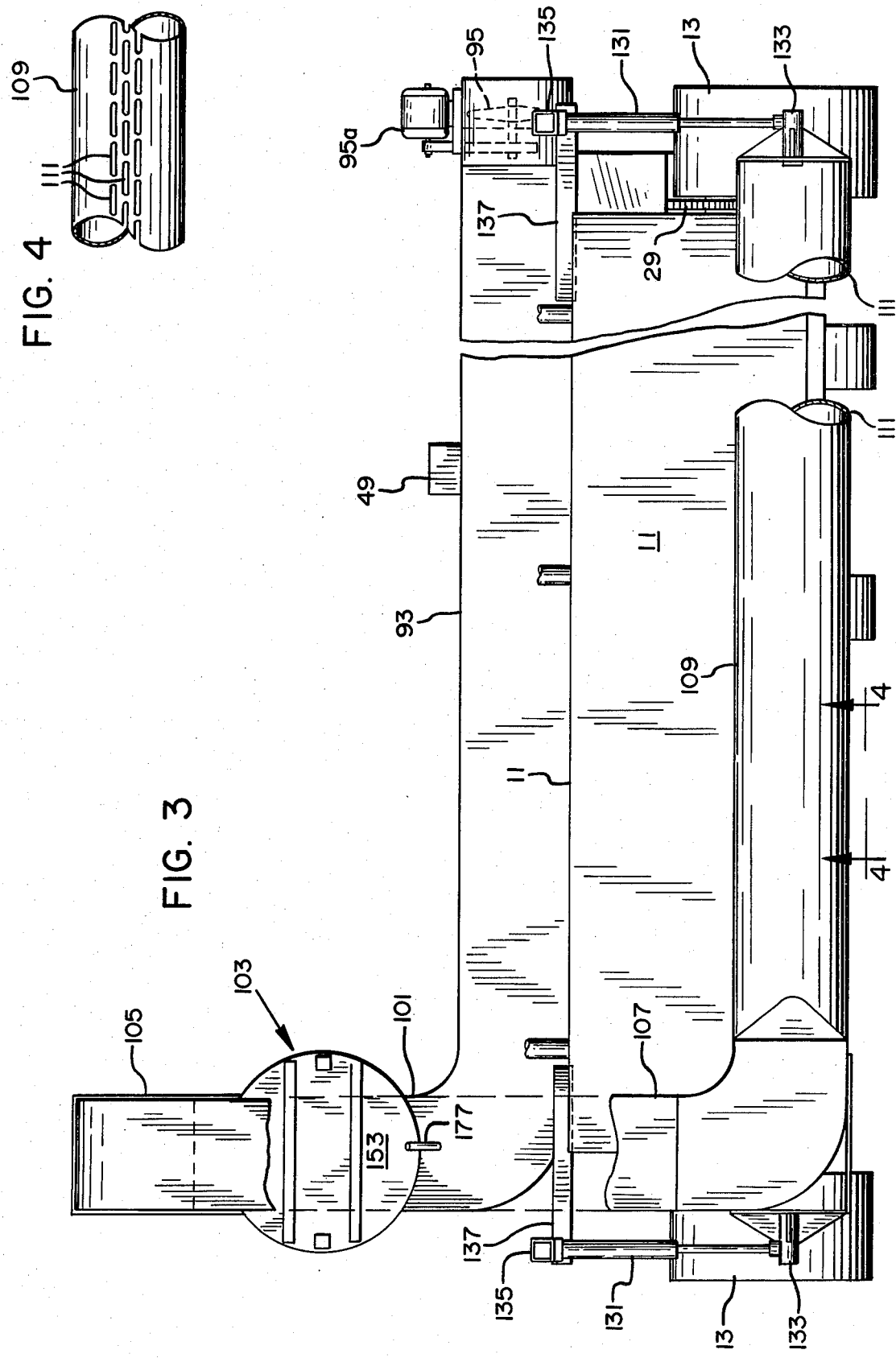

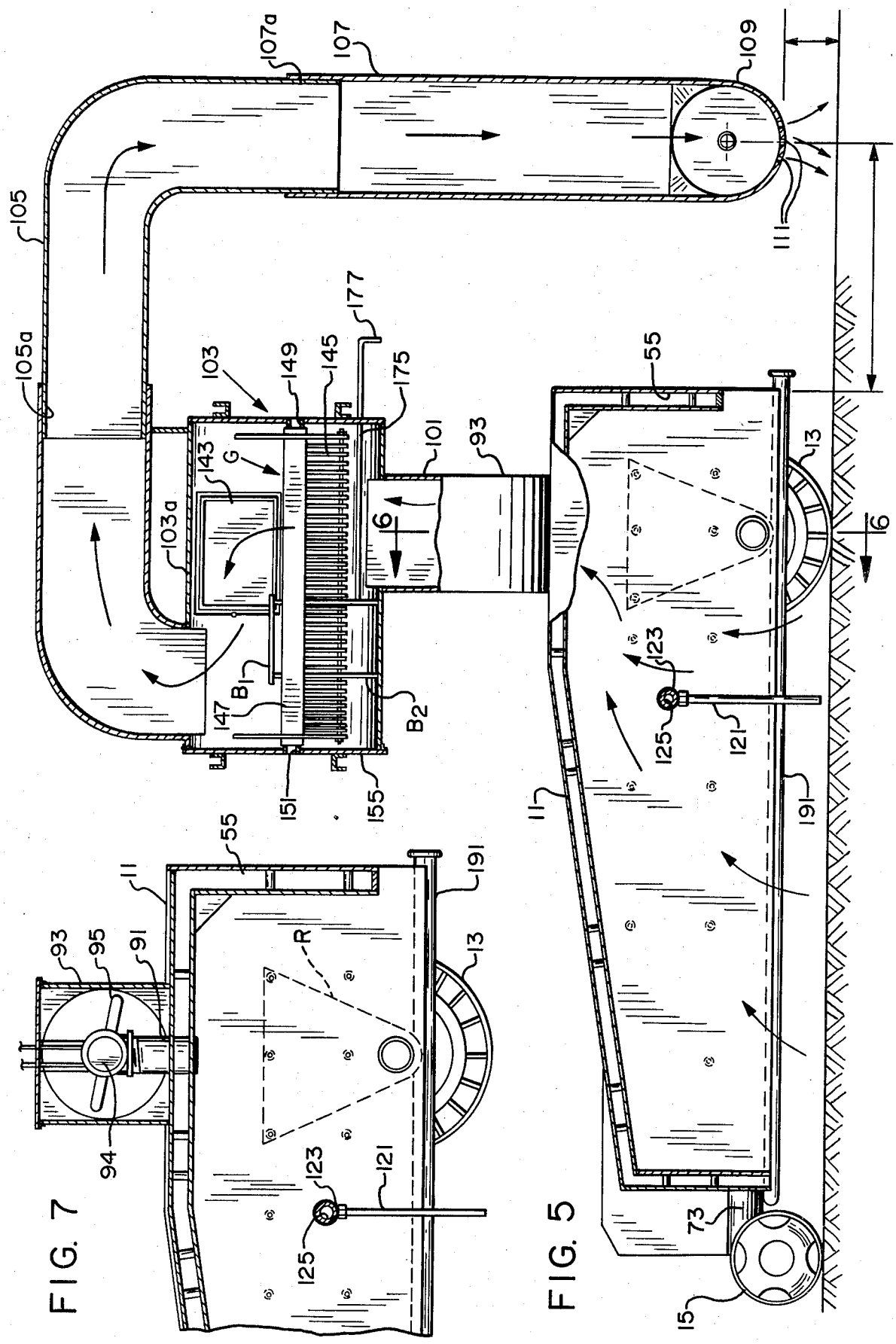

FIELD BURNER APPARATUS

BACKGROUND OF THE INVENTION

It is common practice in geographical areas where the crop is grass seed, to burn the stubble, loose grass, etc. (hereinafter sometimes "grass residue") after harvest to sterilize the soil to lessen substantially the growth of undesirable plant life and spore or insect borne disease during the next growing season. The burning process ladens the air with smoke particles, increasing the pollution thereof dramatically.

I am aware of a number of attempts to lessen the smoke produced during field burning operations. Some of these have operated on the principle of directing an intense flame on the grass residue in the hopes of lessening the production of smoke. Some of these have been partially successful, in that less smoke is produced, but the high temperatures cause rapid deterioration of the equipment and the repair rate is high indeed.

SUMMARY OF THE INVENTION

The present invention proceeds on a different theory, namely, to burn the loose hay and stubble at a relatively low temperature and to withdraw the products of combustion including smoke and direct them into a furnace of sufficiently high temperature as to consume the smoke and other unburned particles, whereafter the hot and now relatively clean gases are directed forwardly just in front of the machine and onto the hay and stubble to cause it to ignite and burn, whereupon the field burner travels over the burning area to withdraw the combustion gases and repeat the above steps with a minimum escapage of smoke to the atmosphere.

A main object of the invention is to provide a vehicle for carrying out the above steps.

A further object is to provide such a vehicle providing a water jacketed box providing a downwardly facing cavity for covering the burning area, and ground contacting elements for turning over loose grass particles to insure its being exposed to the burning process.

The subject matter which I regard as my invention is particularly pointed out and distinctly claimed in the concluding portion of this specification. The invention, however, both as to organization and method of operation, together with further advantages and objects thereof, may be best understood by reference to the following description, taken in connection with the following drawings, wherein like reference characters refer to like elements.

BRIEF DESCRIPTION OF THE DRAWINGS

FIG. 1 is a side elevational view of my burner;

FIG. 2 is a top view of the same;

FIG. 3 is a front view of the same on an enlarged scale;

FIG. 4 is a fragmentary view taken in the direction of the arrows 4—4 of FIG. 3;

FIG. 5 is a longitudinal sectional view taken on a scale slightly larger than FIG. 3;

FIG. 7 is a fragmentary longitudinal vertical section, taken along line 7—7 of FIG. 6 on a reduced scale;

Referring to FIGS. 1 and 5, the machine includes an inverted hollow box-like frame member 11 (hereinafter box or frame) which is supported laterally at its front by a pair of wheels 13 and at its rear by a pair of steerable wheels 15. The field burner may be either self-propelled (as shown) or it may be caused to travel across a field in any other manner, such as by being pushed or pulled.

Referring to FIG. 2, the machine has an internal combustion engine 21 which is cooled by its own internal water system. The engine's drive shaft 23 directly drives a hydraulic pump 25. Hydraulic lines (not shown) from this pump lead to and from a pair of hydraulic motors 27, one for each wheel 13, mounted on the frame 11. Each motor drives its wheel through a chain and sprocket drive 29 (FIGS. 1 and 2).

Figures 1, 2:
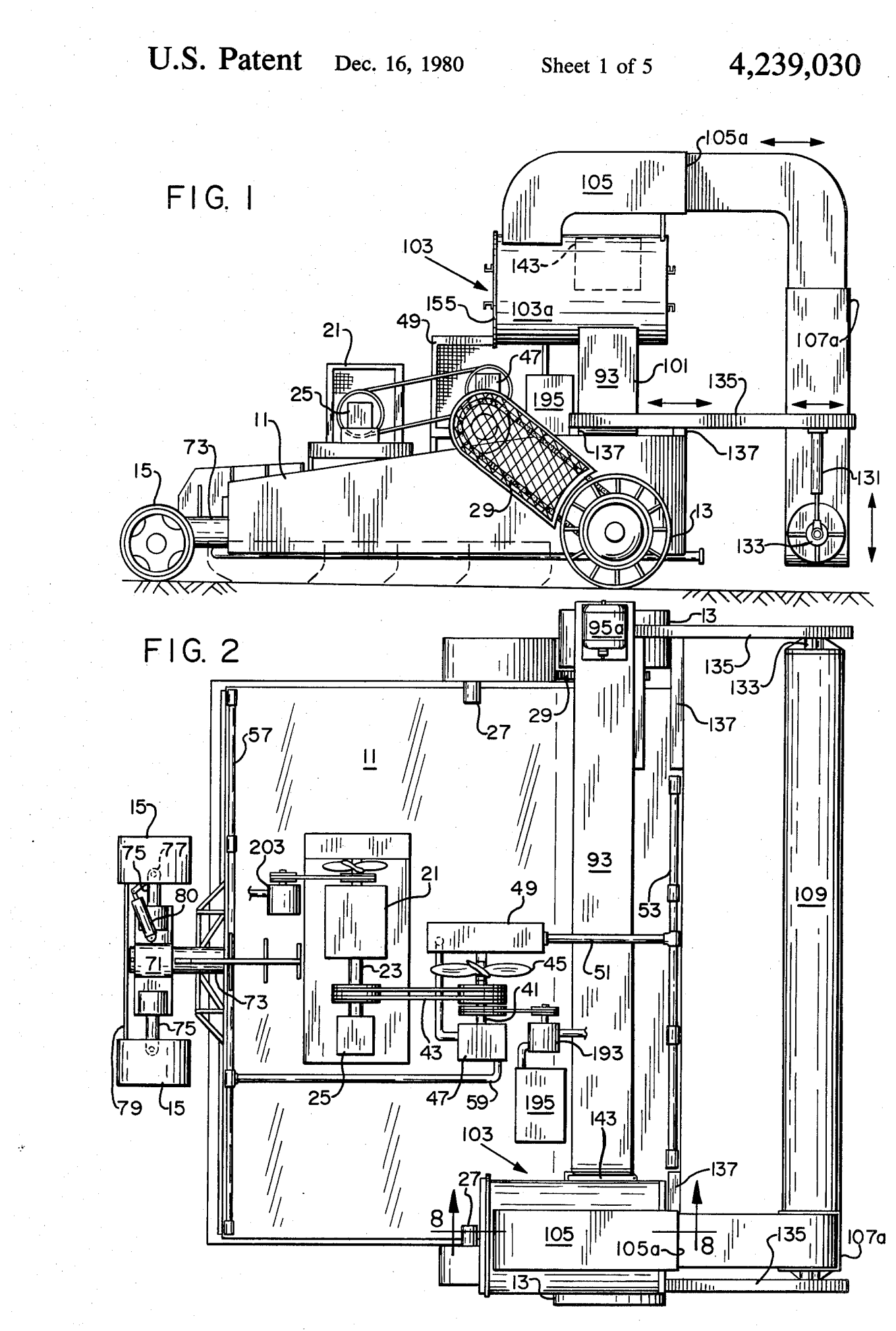
Figure 6:
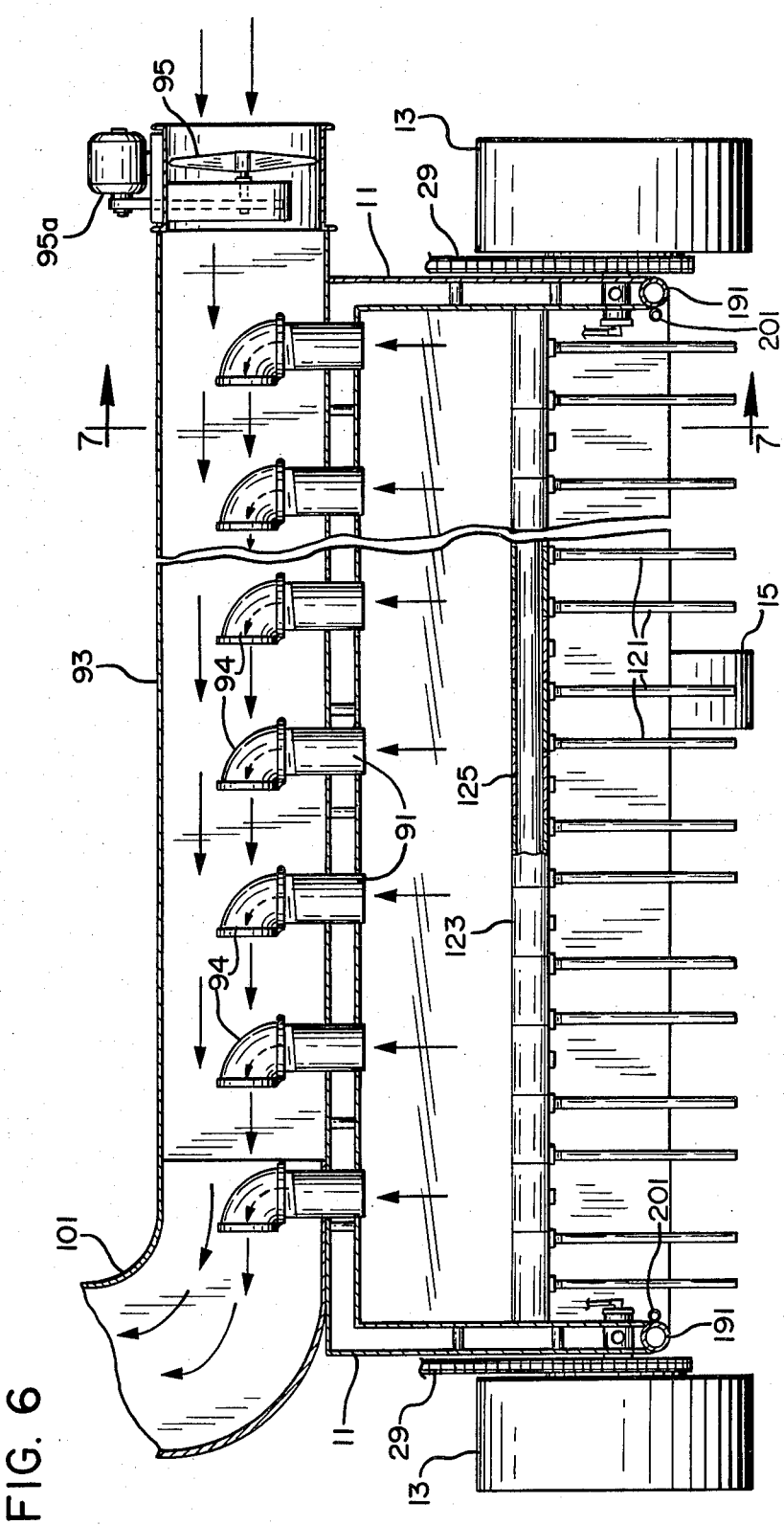
FIG. 6 is a fragmentary transverse vertical section taken along line 6—6 of FIG. 5, on a somewhat larger scale.

The drive shaft 23 drives a second shaft 41 (FIG. 2) by a pulley and belt drive 43. Shaft 41 drives both a fan 45 and a water pump 47. The fan forces air through a radiator 49 to cool water forced through the radiator 49 by the pump 47. Water leaves the radiator 49 via an outlet line 51 which connects to a cross line 53. The latter is connected to a water jacket 55 (FIGS. 5 and 7) which extends substantially coextensive with the frame 11 and by which the frame is cooled.

Water is conducted from the jacket 55 at the rear of the frame by a cross return line 57 (FIG. 2) and thence to a longitudinal return line 59 connected to the pump 47.

The steerable wheels 15 are mounted and steered as follows. A cross axle housing 71 (FIG. 2) is turnably mounted on a longitudinal right trunnion 73. The housing 71 has a pair of laterally projecting rigid stub axles 75, one for each wheel 15. Each wheel is mounted by a vertical pivot 77 on its stub axle, and the wheels are pivotally connected to a tie rod 79 to swing in unison. For steering, a hydraulic piston and cylinder unit 80 turns one of the wheels, which through the tie rod similarly turns the other wheel. The cylinder unit 80 receives hydraulic fluid from the pump under the control of a valve (not shown).

Referring to FIGS. 5-7, assume that the portion of the field beneath the machine is set afire (in a manner to be presently explained), the hot gaseous products of combustion along with entrained solid particles rise within the interior of the frame 11 and are sucked into the lower ends of a series of nozzles 91 (FIG. 6). The latter project upwardly into a cross duct 93 and terminate in end portions 94 which are directed to the left as the parts are shown in FIG. 6. Suction is created by ambient aire which is drawn into the cross duct 93 by a fan 95 and driven by the fan past the downstream-directed upper nozzle ends.

A mixture of hot products of combustion and ambient air leaves the cross duct and exits through a riser duct 101 (FIGS. 5 and 6) leading to the bottom of a furnace 103 (to be presently described). After passing through the furnace, the now considerably hotter gaseous mixture exits into a forwardly extending horizontal duct 105 (FIG. 5). The latter leads to a vertical down duct 107 which connects with a horizontal hot air distributor tube 109 (FIGS. 5 and 3) which extends across the front of the machine. The distributor tube has a series of outlet slots 111 (FIGS. 4 and 5) formed in its lower portion to direct the hot gaseous mixture downwardly onto the portion of the field just in advance of the frame 11. The furnace 103 elevates the temperature of this mixture to a level such that when discharged from the tube 109 it causes the grass to ignite. I start ignition in the first place in a similar measure, i.e., using the furnace to elevate the temperature of air drawn through it, to a level sufficient to cause ignition.

I have discovered that there is a slight delay between the time of ignition and the time that smoke is created. In this interim, the box 11 will move to a position over the now burning hay and stubble so that smoke is entrapped within the box 11, rather than being released to the atmosphere.

By staggering the slots 111 and making them long enough so that they overlap, I cover the entire width of the area being burned.

In order to expose the underlying portions of the hay or loose grass to the burning process, I provide, just rearwardly of the wheels 13, a cross row of dangling rake tines 121 (FIGS. 5-7) which are mounted by sleeves 123 on a hollow cross shaft 125 in pivotal fashion so that they can yield when encountering stones and other immovable objects. The rake tines function to rake the hay, causing it to turn over so that all portions are exposed to the burning process and are consumed within the confines of the box 11. The box is sufficiently extensive in a fore and aft direction, in relation to the speed of travel of the vehicle, that as the box cavity uncovers a burned area, the burning process has been so effectively carried out that minimal smoke rises from such area.

The hollow shaft 125 communicates at its ends with the water jacket 55 (FIG. 6) so that cooling water passes through the shaft to cool it. Cooling water also passes through hollow axles which support wheels 13 (FIG. 6). To facilitate this action, the axles are formed with holes in the portions extending through the jacket, and have piping at their inner ends leading to the roof portion of the jacket. Cross lines 53 has interior extensions (not shown) projecting downwardly into the side jacket portions to insure proper water circulation. Reinforcing plates R (FIG. 7) may be provided on the opposite outer faces of the water jacket side portions for transmitting the axle load to the box.

The cross tube 109 is mounted for adjustment for different operating conditions. Thus the duct 105 is made of two sections having a slip joint at 105a (Fig. 5) to enable fore and aft adjustment of the cross tube, as best suits the parameters of the particular field being burned.

The down duct 107 is similarly formed with a slip joint at 107a to enable the height of the tube relative to the ground to be adjusted for the above purpose.

The cross tube 109 is supported by a pair of double acting piston and cylinder units 131 (FIGS. 3 and 1), connected at their lower ends to the ends 133 of the cross tube and adjustably bolted at their upper ends on the forward ends of a pair of beams 135. The rear end portions of the latter are fixedly mounted at 137 on the frame 11.

The slip joint 105a facilitates repositioning of the units 131 on the beams for forward or rearward adjustment of the tube 109. The slip joint 107a enables the hydraulic units 131 to be actuated to vertically adjust the tube.

The units 131 are connected to the pump 25 as a source of hydraulic fluid. The operation of the units is controlled by suitable valves (not shown).

Figure 8:
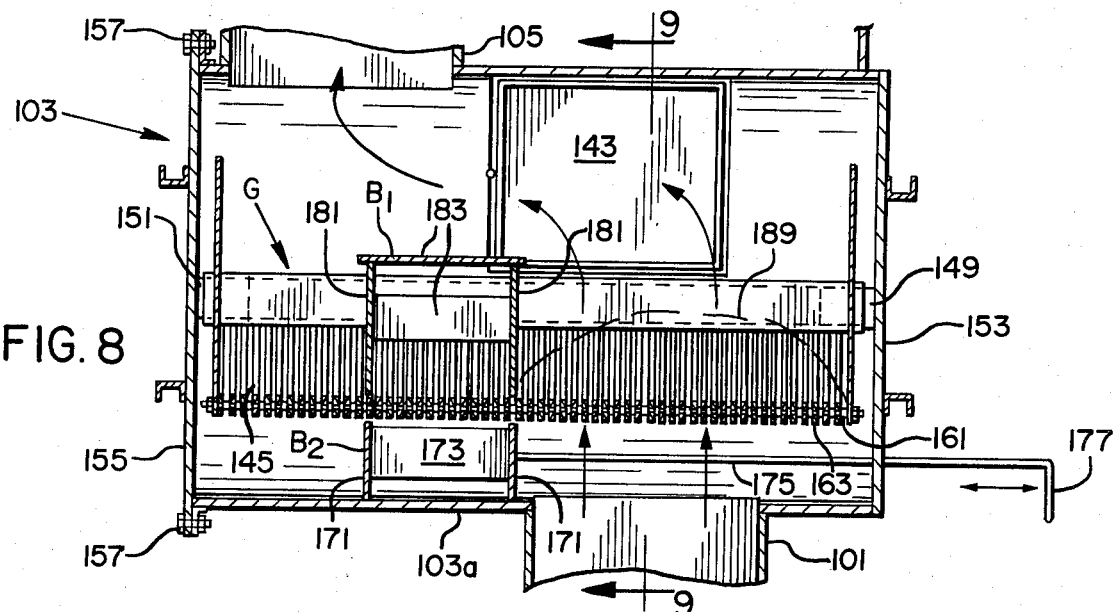
FIG. 8 is a fragmentary longitudinal vertical section taken along line 8—8 of FIG. 2, on an enlarged scale.
Figure 9:
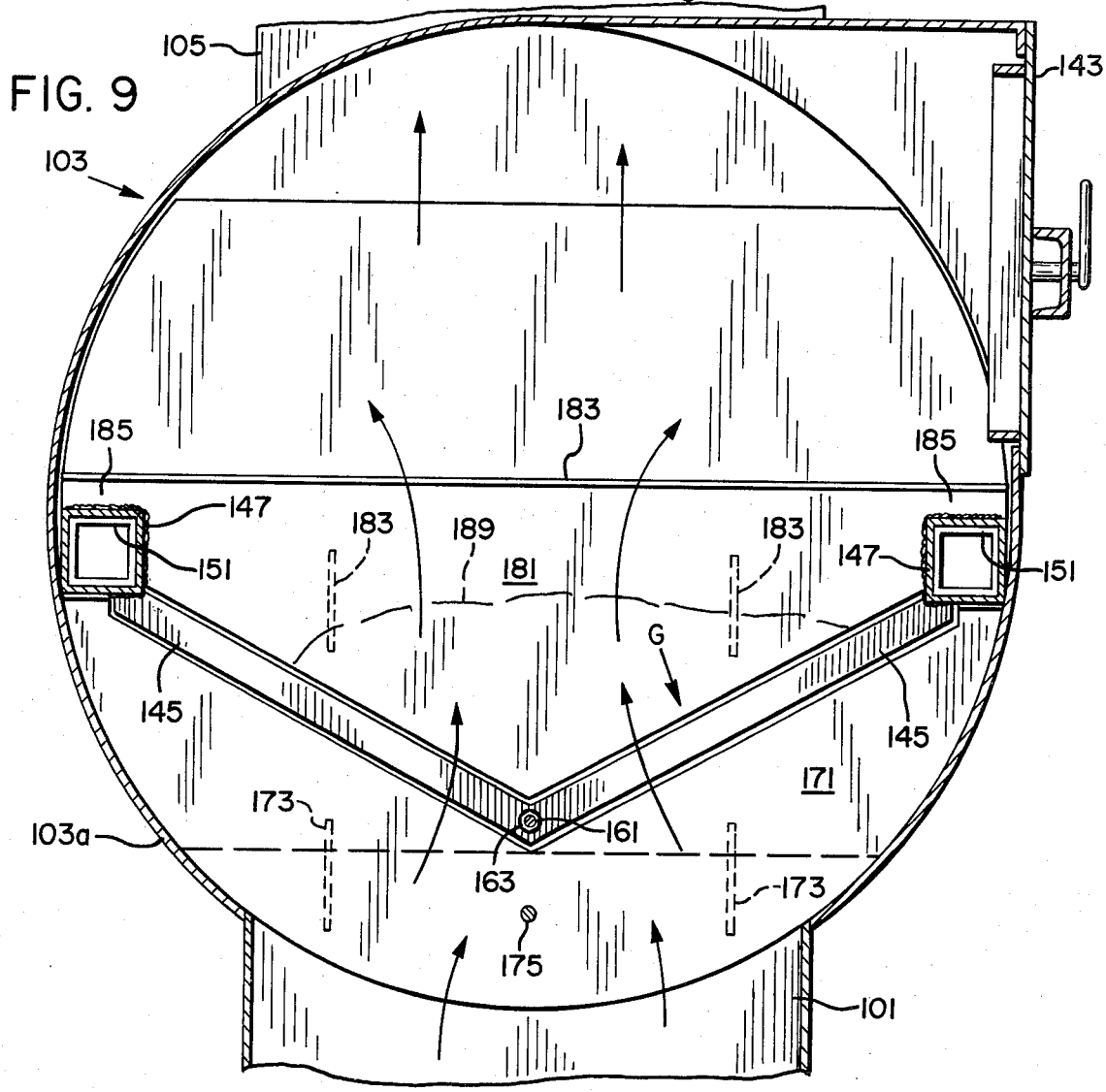
FIG. 9 is a fragmentary vertical transverse section taken along line 9—9 of FIG. 8, on an enlarged scale.

FIGS. 5, 8 and 9 best show the construction of the furnace 103. It comprises a drum 103a supported by the duct 101 which is connected to the drum forwardly of its midpoint (FIG. 5). Within the drum is a grate G to burn coal, which can be supplied in any fashion. I have shown a door 143 by which this may be manually done.

The grate comprises plural V-shaped grate bars 145 (FIG. 9) which are secured at their ends to a pair of hollow support tubes 147 of square cross section. These slip over two pairs of similarly shaped support stubs 149 and 151 (FIG. 8). Stubs 149 are secured to a fixed end member 153 of the drum, while stubs 151 are secured to an end member 155 at the opposite end of the drum. End member 155 is detachably secured by bolts 157 to the drum 103a to facilitate its removal. This enables the drum to be cleaned out, when desirable, and facilitates assembly of the grate within the drum.

The V-portions of the grate bars are bored to receive a rod 161 (FIG. 9) which passes through the V-portions and through spacers 163 between such portions, which maintain a proper spacing of the grate bars relative to one another.

Provision is made for controlling the extent of the grate surface that is used, in proper relationship to the requirements of the particular field being burned. To this end two baffles are provided, an upper one $B_1$ and a lower one $B_2$ (FIG. 8). The latter comprises a pair of generally crescent shaped plates 171 (FIG. 9) connected together by spacers 173 and resting on the curved interior surface of the drum 103a. Baffle $B_2$ may be adjusted along the drum by an adjustment rod 175 (FIG. 8) which slidably passes through the end member 153 and has a handle 177 to facilitate locating the baffle $B_2$ at a desired location.

The upper baffle $B_1$ is generally similarly formed, comprising a pair of plates 181 of generally trapezoidal shape (FIG. 9) connected by spacers 183. The plates have support tangs 185 (FIG. 9) which rest on the support tubes 147. The position of baffle $B_1$ can be adjusted in any suitable fashion. I have shown that it can be manually positioned by opening the door 143 to gain access to the baffle.

Baffle $B_2$ determines how much of the grate receives the mixture of the gaseous mixture from the duct 101, while baffle $B_1$ determines the extent of the bed 189 (FIG. 8) of coals on the grate. Experience will soon enable the operator to make the proper adjustments.

In addition to the above adjustments, the speed of the fan 95 can be varied (as will be presently described) to change the suction at the nozzles 91 and to alter the mixture of combustion products and ambient air. As this mixture passes through the furnace, the burning coals therein consume the entrained solids, including a substantial percentage of smoke particles, whereby the field burning process can be carried out with a minimum of escaping smoke.

Fan 95 is driven by a hydraulic motor 95a, which is connected through a valve (not shown) to pump 25. Adjusting the valve postion varies the fan speed. While the motor is shown in FIG. 3 above the fan, it could be mounted directly behind the fan and drive it directly. The incoming air would cool the motor.

Referring to FIG. 6, I provide a water spray pipe 191 at the lower side portions of the box and at its rear, having nozzles to downwardly spray a curtain of water to confine the burning operation to a strip equal to the width of the box. This additionally holds down the escapage of smoke. Water is supplied to the pipe 191 by a water pump 193 (FIG. 2) through piping and valves, not shown. A water reservoir 195 is provided on the vehicle and connected to the pump 193 to replenish the water dispensed by the pipe 191. The nozzles may be adjustable to vary the angle of the water spray as suits operating conditions. The pump 193 is driven, as shown in FIG. 2, by shaft 41.

Referring to FIG. 6, I provide an air pipe 201 at the sides and rear of the box, which is connected by piping and a valve (not shown) to an air compressor 203 (FIG. 2). The latter is driven by shaft 23. The pipe has nozzles (not shown) spraying air downwardly in overlapping cones to form an air curtain which acts to retain flying particles under the box, to be consumed, rather than escaping to the atmosphere. These nozzles may be adjusted to better adapt the curtain to operating conditions.

The air curtain, by confining flying particles to the underside of the box, enables the box to be made shorter than otherwise would be the case.

Referring to FIG. 1, I may provide chains or metal drag fingers (represented by the broken curved lines) at the sides and rear of the box to better define the area being burned.

What is claimed is:

1. A field burner comprising a vehicle formed with a downwardly opening cavity to cover a burning area,
   first means for creating a zone of elevated temperature higher than that in said cavity,
   second means for withdrawing products of combustion from the cavity and directing them through said zone,
   and thence discharging them onto the field forwardly of the cavity to thereby elevate the temperature of the field portion about to be covered by the cavity.

2. A field burner as described in claim 1 wherein said second means includes mixing means for mixing ambient air with the combustion products prior to their entering said zone.

3. A field burner as described in claim 2 wherein said mixing means includes a suction duct and a series of suction tubes extending from said cavity into said suction duct and terminating in suction nozzles pointing in a predetermined direction,
   said mixing means providing a flow of air in said duct past said nozzles in said direction.

4. A field burner as described in claim 1 wherein said first means includes a furnace having a fuel grate, and means for varying the effective area of said grate.

5. A field burner as described in claim 1 wherein said second means includes a hot gas distributor tube across the front of said vehicle,
   and means for adjustably mounting said tube for movement vertically and horizontally relative to said cavity.

6. A field burner as described in claim 1 wherein there is a source of water under pressure on said vehicle and means for spraying water onto the field at either side of said vehicle.

7. A field burner as described in claim 5, wherein there is a prime mover on said vehicle, hydraulic pump means driven by said prime mover, and hydraulic motor means for propelling said vehicle and for effecting adjusting movement of said distributor tube.

8. A field burner as described in claim 6, wherein said cavity is defined by a water jacket, and water pump means driven by said prime mover for circulating water through said jacket.

9. A field burner as described in claim 1, wherein there are means on said vehicle for contacting the field area beneath said cavity for turning over loose burnable material to better subject it to the burning process.

10. A field burner as described in claim 1, wherein said second means includes mixing means for mixing ambient air with the combustion products prior to their entering said zone,
    said mixing means includes a suction duct and a series of suction tubes extending from said cavity into said suction duct and terminating in suction nozzles pointing in a predetermined direction,
    said mixing means providing a flow of air in said duct past said nozzles in said direction,
    said first means includes a furnace having a fuel grate, and means for varying the effective area of said grate,
    said second means includes a hot gas distributor tube across the front of said vehicle,
    and means for adjustably mounting said tube for movement vertically and horizontally relative to said cavity,
    a source of water under pressure of said vehicle and means for spraying water onto the field at either side of said vehicle,
    a prime mover on said vehicle, hydraulic pump means driven by said prime mover, and hydraulic motor means for propelling said vehicle and for effecting adjusting movement of said distributor tube,
    said cavity is defined by a water jacket, and water pump means driven by said prime mover for circulating water through said jacket.

* * * * *